(12) United States Patent
Mori et al.

(10) Patent No.: US 12,475,717 B2
(45) Date of Patent: Nov. 18, 2025

(54) OBJECT RECOGNITION DEVICE AND OBJECT RECOGNITION METHOD

(71) Applicant: Mitsubishi Electric Corporation, Tokyo (JP)

(72) Inventors: Masanori Mori, Tokyo (JP); Hideaki Tamazumi, Hiroshima (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/726,825

(22) PCT Filed: Jan. 24, 2023

(86) PCT No.: PCT/JP2023/002062
§ 371 (c)(1),
(2) Date: Jul. 5, 2024

(87) PCT Pub. No.: WO2023/145723
PCT Pub. Date: Aug. 3, 2023

(65) Prior Publication Data
US 2025/0095382 A1    Mar. 20, 2025

(30) Foreign Application Priority Data
Jan. 28, 2022 (JP) ................................ 2022-011376

(51) Int. Cl.
*G06V 20/58* (2022.01)
(52) U.S. Cl.
CPC ..................................... *G06V 20/58* (2022.01)
(58) Field of Classification Search
CPC .................. G06V 20/58; G08G 1/16
See application file for complete search history.

(56) References Cited

U.S. PATENT DOCUMENTS 10,460,467 B2 * 10/2019 Akiyama .................. G06T 7/70
11,494,906 B2 * 11/2022 Sakai .................... G06V 40/167
(Continued)

FOREIGN PATENT DOCUMENTS

| JP | 2004-012186 A | 1/2004 |
| JP | 2019-053633 A | 4/2019 |

OTHER PUBLICATIONS

International Search Report and Written Opinion mailed on Apr. 4, 2023, received for PCT Application No. PCT/JP2023/002062, filed on Jan. 24, 2023, 8 pages including English Translation.
(Continued)

*Primary Examiner* — James M Pontius
(74) *Attorney, Agent, or Firm* — XSENSUS LLP

(57) ABSTRACT

An object recognition device of the present invention includes: an object detection unit which detects, as an object, a thing present around a sensor platform; a processing target object storage unit which stores the object as a processing target object, with a number there of being an upper limit value or smaller; and an object processing unit which, in a case where the processing target objects whose number is the upper limit value are stored, selects an object having a lowest evaluation value among the stored processing target objects whose number is the upper limit value, determines one object of the selected processing target object and an object newly detected by the object detection unit, and stores the determined object as the processing target object in the processing target object storage unit.

9 Claims, 6 Drawing Sheets

(56) References Cited

U.S. PATENT DOCUMENTS

| | | |
|---|---|---|
| 2003/0222812 A1 | 12/2003 | Kishida |
| 2015/0146010 A1* | 5/2015 | Yokozeki .............. G01S 3/7864 |
| | | 348/169 |
| 2016/0335780 A1* | 11/2016 | Tsuji ....................... G06T 7/248 |
| 2017/0358102 A1* | 12/2017 | Akiyama ............... G06V 20/58 |
| 2019/0084558 A1 | 3/2019 | Kaminade et al. |
| 2020/0394797 A1* | 12/2020 | Sakai .................... G06V 40/167 |
| 2024/0317267 A1* | 9/2024 | Bergquist ............. G06V 10/776 |
| 2025/0078552 A1* | 3/2025 | Asaba ................ G06V 30/1916 |

OTHER PUBLICATIONS

Office Action issued on Jul. 29, 2025, in corresponding Japanese patent Application No. 2022-011376, 8 pages.

* cited by examiner

OBJECT RECOGNITION DEVICE AND OBJECT RECOGNITION METHOD

CROSS-REFERENCE TO RELATED APPLICATIONS

This application is a national stage application, pursuant to 35 U.S.C. § 371, of International Patent Application No. PCT/JP2023/002062, filed Jan. 24, 2023, which claims priority from Japanese Patent Application No. 2022-011376, filed Jan. 28, 2022, the entire contents of each are incorporated herein by reference.

TECHNICAL FIELD

The present invention relates to an object recognition device and an object recognition method for detecting, as an object, a thing present around a sensor platform.

BACKGROUND ART

In recent years, recognition of surrounding situations has been desired from requirements in safety technology, requirements in automated driving technology, and the like. For example, in a case where a mobile object such as a vehicle or a robot performs collision avoidance, lane changes, or the like, it is important to recognize the surrounding situation. Therefore, such a mobile object is often provided with a thing detection device (object recognition device) for detecting (recognizing) a thing. Such technology for detecting and recognizing a thing is disclosed in Patent Document 1, for example.

A vehicle surrounding monitoring device disclosed in Patent Document 1 is provided to a driving assistance system having driving assistance control means which performs safety-related driving assistance control for issuing an alarm when the own vehicle is likely to collide with a mobile object relatively approaching the own vehicle, and operation-related driving assistance control for assisting operation for transverse-direction movement of the own vehicle, and the vehicle surrounding monitoring device provides surrounding monitoring information to the driving assistance control means. The vehicle surrounding monitoring device includes: mobile object detection means for detecting a mobile object moving around the own vehicle; first selection means which selects a top first set number of mobile objects having high priorities so as to prioritize mobile objects that are relatively approaching the own vehicle and indicate short times to collision which are predicted times until collision with the own vehicle, among the mobile objects detected by the mobile object detection means; second selection means which selects a top second set number of mobile objects having high priorities so as to prioritize mobile objects of which the relative distances to the own vehicle are short, among the mobile objects detected by the mobile object detection means other than the mobile objects selected by the first selection means; and information providing means which provides information about the mobile objects selected by the first selection means and the mobile objects selected by the second selection means, as the surrounding monitoring information, to the driving assistance control means.

CITATION LIST

Patent Document

Patent Document 1: Japanese Laid-Open Patent Publication No. 2019-053633

SUMMARY OF THE INVENTION

Problem to be Solved by the Invention

The vehicle surrounding monitoring device disclosed in Patent Document 1 selects a top first set number of mobile objects having high priorities so as to prioritize mobile objects indicating short times to collision among mobile objects moving around the own vehicle and detected by the mobile object detection means, in safety-related driving assistance control for preventing a collision accident, and selects a top second set number of mobile objects having high priorities so as to prioritize mobile objects of which the relative distances to the own vehicle are short among the mobile objects, in lane change assistance control for assisting a steering wheel operation for lane change. However, such information processing in which detected mobile objects moving around the own vehicle are sorted in accordance with predetermined priorities and then a set number of the mobile objects are selected, requires a long time. In particular, in a case where there are a large number of or a wide variety of (various kinds of) objects to be recognized, a longer time is required. This issue is important because there is limitation in the processing capabilities of resources such as a CPU for executing the information processing.

The present invention has been made in view of the above circumstances, and an object of the present invention is to provide an object recognition device and an object recognition method that can select recognition objects through simpler information processing.

Means to Solve the Problem

Through various studies, the present inventors have found out that the above object is achieved by the present invention below. That is, an object recognition device according to one aspect of the present invention is a device provided to a sensor platform, and includes: an object detection unit which detects, as an object, a thing present around the sensor platform; a processing target object storage unit which stores the object as a processing target object, with a number thereof being a predetermined upper limit value or smaller, such that the processing target object is associated with an evaluation value for storing and keeping the processing target object, the evaluation value being determined in accordance with a situation of the object relative to the sensor platform; and an object processing unit which, in a case where the processing target objects whose number is the upper limit value are stored in the processing target object storage unit, performs selection storage processing of selecting a processing target object associated with a lowest evaluation value among the processing target objects whose number is the upper limit value and which are stored in the processing target object storage unit, determining one object of the selected processing target object and an object newly detected by the object detection unit on the basis of the evaluation value for the selected processing target object and the evaluation value for the object newly detected by the object detection unit, and storing the determined object as the processing target object in the processing target object storage unit. Preferably, in the above object recognition device, in a case where the evaluation value for the selected processing target object is lower than the evaluation value for the object newly detected by the object detection unit, the object processing unit stores, as the processing target object, the object newly detected by the object detection unit, in place of the selected processing target object, in the processing target object storage unit.

In this object recognition device, the processing target object associated with the lowest evaluation value is selected from the processing target objects stored in the processing target object storage unit. Therefore, the processing target objects stored in the processing target object storage unit need not be sorted (rearranged) in priority order. In the above object recognition device, determination of an object to be stored in the processing target object storage unit can be performed by comparing the evaluation value for the selected processing target object and the evaluation value for an object newly detected by the object detection unit. Thus, the above object recognition device can select recognition objects through simpler information processing.

According to another aspect, in the above object recognition device, in a case where a plurality of objects are newly detected by the object detection unit, the object processing unit performs the selection storage processing for the plurality of objects one by one sequentially.

In this object recognition device, the selection storage processing is performed for a plurality of objects one by one sequentially. Therefore, for example, in a case where one of the plurality of objects is stored as a processing target object in the processing target object storage unit through the selection storage processing, when the selection storage processing is performed on an object other than the one object, the one object and the other object can be compared with each other by their evaluation values. Thus, even in a case where a plurality of objects are newly detected by the object detection unit, an object having a truly high evaluation value can be stored as the processing target object in the processing target object storage unit.

According to another aspect, in each above object recognition device, the evaluation value to be associated with each object includes a plurality of evaluation values based on a plurality of criteria that are different kinds, and in the selection of the processing target object associated with the lowest evaluation value, the object processing unit extracts processing target objects as candidates for the selection by the first evaluation value based on a first criterion among the plurality of criteria, from the processing target objects whose number is the upper limit value and which are stored in the processing target object storage unit, and selects the processing target object associated with the lowest evaluation value, from the processing target objects extracted as the candidates for the selection, on the basis of a second evaluation value based on a second criterion different from the first criterion among the plurality of criteria.

In this object recognition device, a plurality of evaluation values based on a plurality of criteria that are different kinds are provided as evaluation values to be associated with the objects. Thus, objects to be stored in the processing target object storage unit can be determined from various perspectives by the plurality of criteria (indices, references) that are different kinds.

According to another aspect, in the above object recognition device, in the extraction of the processing target objects as the candidates for the selection, the object processing unit divides the processing target objects stored in the processing target object storage unit and the object newly detected by the object detection unit into a plurality of groups for respective first evaluation values based on the first criterion, and performs the extraction for each group.

In the above object recognition device, extraction is performed for each of groups into which objects are divided by respective first evaluation values. Thus, a processing target object as a candidate for the selection can be extracted using various sides (levels) of the first criterion.

According to another aspect, in the above object recognition device, a minimum keeping value which is a minimum number of the processing target objects that should be stored and kept in the processing target object storage unit is imparted correspondingly to the group, and in the extraction for each group, in a case where the group is imparted with the minimum keeping value, the object processing unit compares the number of the processing target objects stored in the processing target object storage unit with the minimum keeping value, and as a result of the comparison, if the number of the processing target objects stored in the processing target object storage unit is the minimum keeping value or smaller, the object processing unit invalidates the extraction. Preferably, in the above object recognition device, in a case where the extraction is invalidated, the object processing unit does not execute the selection storage processing for a case where the extraction is not invalidated.

In this object recognition device, in a case where, in the group imparted with the minimum keeping value, the number of processing target objects stored in the processing target object storage unit is the minimum keeping value or smaller, the extraction is invalidated. Thus, it is at least ensured that the processing target objects in the group imparted with the minimum keeping value are stored.

According to another aspect, in the above object recognition device, in the determination of one object of the selected processing target object and the object newly detected by the object detection unit, firstly, the object processing unit determines the one object by the first evaluation value based on the first criterion, and secondly, in a case where the one object is not successfully determined by the first evaluation value based on the first criterion, the object processing unit determines the one object by the second evaluation value based on the second criterion.

In this object recognition device, firstly, the one object is determined by the first evaluation value based on the first criterion. Thus, an object to be stored in the processing target object storage unit can be determined from the perspective of the first criterion. Secondly, in a case where the one object is not successfully determined by the first evaluation value based on the first criterion, the one object is determined by the second evaluation value based on the second criterion. Thus, even in a case where an object to be stored in the processing target object storage unit cannot be determined from the perspective of the first criterion, an object to be stored in the processing target object storage unit can be determined from the perspective of the second criterion.

Preferably, in the above object recognition device, the first criterion is a criterion involving approach, front, and other as the first evaluation value. Among the processing target objects stored in the processing target object storage unit and an object newly detected by the object detection unit, the total number of objects for which the first evaluation values are the approach is denoted by na, the total number of objects for which the first evaluation values are the front is denoted by nb, the minimum keeping value corresponding to the group for the approach is denoted by na0, and the minimum keeping value corresponding to the group for the front is denoted by nb0. Then, the first evaluation value is defined, from the highest one to the lowest one, in the following order: the approach in a case of na≤na0, the front in a case of nb≤nb0, the other, the front in a case of nb>nb0, and then the approach in a case of na>na0. The second criterion is a time to collision of the object with the sensor platform, and the second evaluation value becomes lower as the time to collision becomes longer. In a case where the first evaluation value based on the first criterion for the selected processing target object is approach and the first evaluation value based on the first criterion for the object newly detected by the object detection unit is approach, so that the one object cannot be determined by the first evaluation value based on the first criterion, the object processing unit determines the one object by the second evaluation value based on the second criterion. Preferably, in the above object recognition device, the first criterion is a criterion involving approach, front, and other as the first evaluation value. Among the processing target objects stored in the processing target object storage unit and an object newly detected by the object detection unit, the total number of objects for which the first evaluation values are the approach is denoted by na, the total number of objects for which the first evaluation values are the front is denoted by nb, the minimum keeping value corresponding to the group for the approach is denoted by na0, and the minimum keeping value corresponding to the group for the front is denoted by nb0. Then, the first evaluation value is defined, from the highest one to the lowest one, in the following order: the approach in a case of na≤na0, the front in a case of nb≤nb0, the other, the front in a case of nb>nb0, and then the approach in a case of na>na0. The second criterion is a distance of the object from the sensor platform, and the second evaluation value becomes lower as the distance becomes longer. In a case where the first evaluation value based on the first criterion for the selected processing target object is front and the first evaluation value based on the first criterion for the object newly detected by the object detection unit is front, so that the one object cannot be determined by the first evaluation value based on the first criterion, the object processing unit determines the one object by the second evaluation value based on the second criterion. In a case where the first evaluation value based on the first criterion for the selected processing target object is other and the first evaluation value based on the first criterion for the object newly detected by the object detection unit is other, so that the one object cannot be determined by the first evaluation value based on the first criterion, the object processing unit determines the one object by the second evaluation value based on the second criterion.

According to another aspect, in the above object recognition device, the first evaluation values based on the first criterion include "approach" which indicates that the object is approaching the sensor platform, "front" which indicates that the object is located in front of the sensor platform, and "other" which indicates that the object corresponds to neither the "approach" nor the "front" relative to the sensor platform.

In this object recognition device, an object to be stored in the processing target object storage unit can be determined from the perspective of the first criterion having the first evaluation value determined on the basis of the direction and the traveling state of the object relative to the sensor platform.

According to another aspect, in the above object recognition device, the second evaluation values based on the second criterion include a value of a time to collision of the object with the sensor platform and a value of a distance of the object from the sensor platform.

In this object recognition device, an object to be stored in the processing target object storage unit can be determined from the perspective of the second criterion having the second evaluation value determined on the basis of the traveling state of the object relative to the mobile object or the direction of the object relative to the mobile object.

According to another aspect, in each above object recognition device, when the sensor platform is a mobile object, the object processing unit determines whether or not to invalidate the extraction only in a case where a traveling state of the mobile object satisfies a predetermined condition.

In this object recognition device, since whether or not to invalidate the extraction is determined only in a case where the traveling state of the mobile object satisfies a predetermined condition, it is possible to determine whether or not to invalidate the extraction in consideration of the traveling state of the mobile object.

An object recognition method according to another aspect of the present invention is a method to be executed in a sensor platform and includes: an object detection step of detecting, as an object, a thing present around the sensor platform; and with a processing target object storage unit configured to store the object as a processing target object, with a number thereof being a predetermined upper limit value or smaller, such that the processing target object is associated with an evaluation value for storing and keeping the processing target object, the evaluation value being determined in accordance with a situation of the object relative to the sensor platform, an object processing step of, in a case where the processing target objects whose number is the upper limit value are stored in the processing target object storage unit, selecting a processing target object associated with a lowest evaluation value among the processing target objects whose number is the upper limit value and which are stored in the processing target object storage unit, determining one object of the selected processing target object and an object newly detected by the object detection unit on the basis of the evaluation value for the selected processing target object and the evaluation value for the object newly detected by the object detection unit, and storing the determined object as the processing target object in the processing target object storage unit.

In this object recognition method, the processing target object associated with the lowest evaluation value is selected from the processing target objects stored in the processing target object storage unit. Therefore, the processing target objects stored in the processing target object storage unit need not be sorted (rearranged) in priority order. In the above object recognition method, determination of an object to be stored in the processing target object storage unit can be performed by comparing the evaluation value for the selected processing target object and the evaluation value for an object newly detected by the object detection unit. Thus, the above object recognition method can select recognition objects through simpler information processing.

Effect of the Invention

The object recognition device and the object recognition method according to the present invention can select recognition objects through simpler information processing.

DESCRIPTION OF EMBODIMENTS

Figure 1:
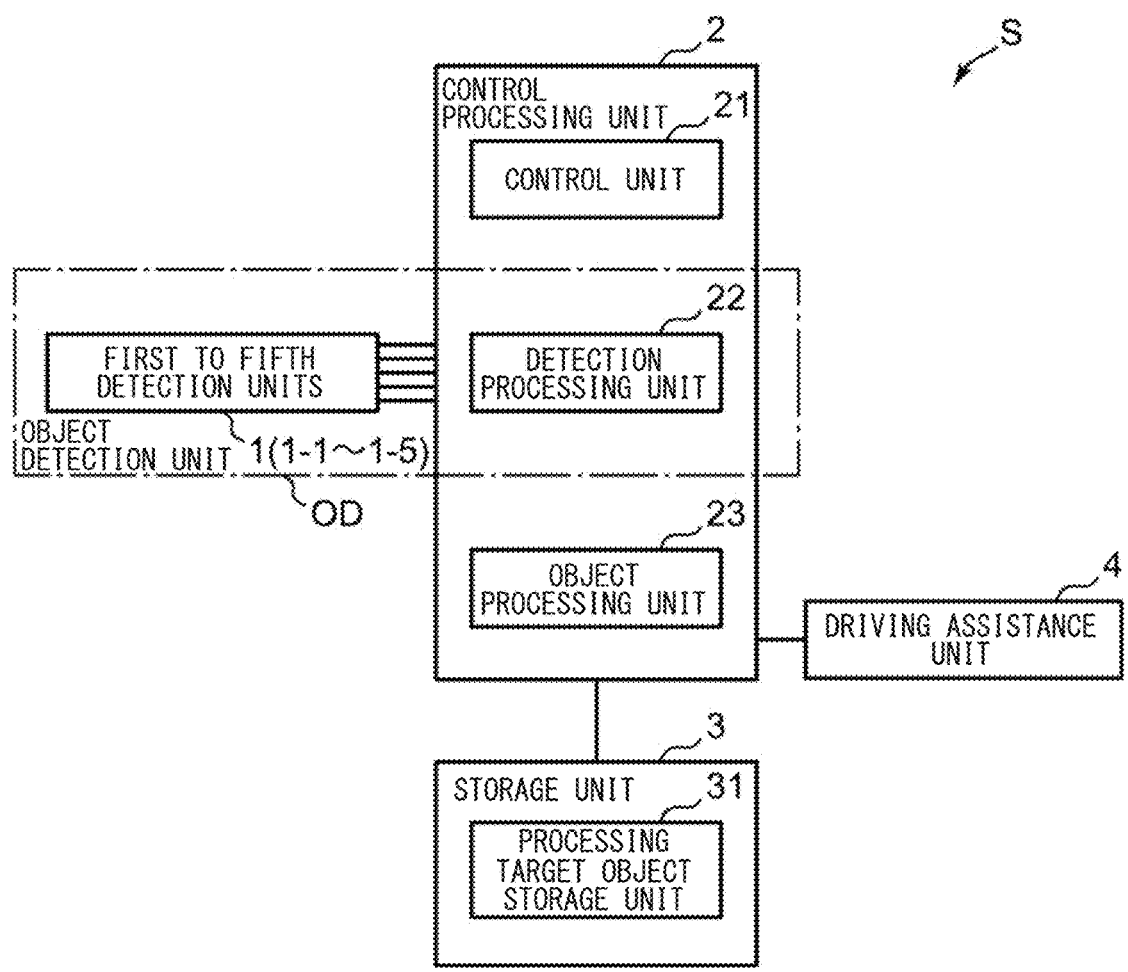
FIG. 1 is a block diagram showing a configuration of an object recognition device according to an embodiment.

Hereinafter, with reference to the drawings, one or a plurality of embodiments of the present invention will be described. However, the scope of the present invention is not limited to the disclosed embodiment(s). In the drawings, components denoted by the same reference characters are the same components, and the description thereof may be omitted as appropriate. In the description, when components are collectively referred to, they are denoted by a reference character with an index deleted, and when an individual component is referred to, the component is denoted by a reference character with an index added.

An object recognition device according to an embodiment is a device provided to a sensor platform and for recognizing a thing present around the sensor platform (a thing in a predetermined range that can be visually recognized from the sensor platform), and object recognition processing is executed on the sensor platform. This object recognition device includes: an object detection unit which detects, as an object, a thing present around the sensor platform; a processing target object storage unit which stores the object as a processing target object, with a number thereof being a predetermined upper limit value or smaller, such that the processing target object is associated with an evaluation value for storing and keeping the processing target object, the evaluation value being determined in accordance with a situation of the object relative to the sensor platform; and an object processing unit which, in a case where the processing target objects whose number is the upper limit value are stored in the processing target object storage unit, performs selection storage processing of selecting a processing target object associated with a lowest evaluation value among the processing target objects whose number is the upper limit value and which are stored in the processing target object storage unit, determining one object of the selected processing target object and an object newly detected by the object detection unit on the basis of the evaluation value for the selected processing target object and the evaluation value for the object newly detected by the object detection unit, and storing the determined object as the processing target object in the processing target object storage unit. The sensor platform is a mobile object or a roadside unit. The mobile object is a device that can change the position of the own unit, and is a vehicle or a robot, for example. The vehicle is a part transportation vehicle in a factory or an automobile, for example. The roadside unit is a device that cannot change the position of the own unit, and is a traffic light or a pole, for example. Hereinafter, a case where the object detection device is mounted to a vehicle as an example of the sensor platform will be described more specifically.

Figure 2:
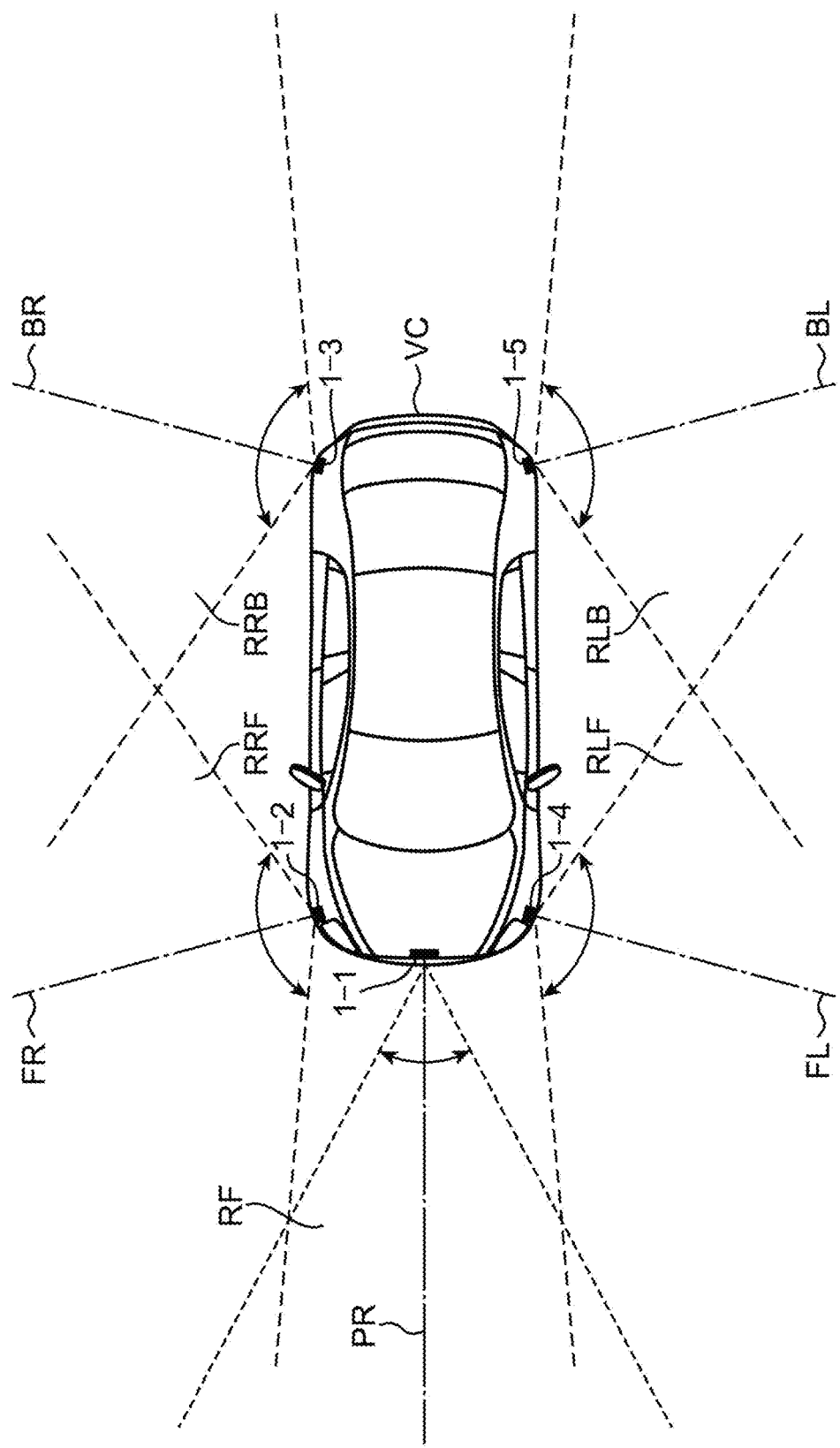
FIG. 2 illustrates first to fifth detection units mounted to a vehicle.
Figure 3:
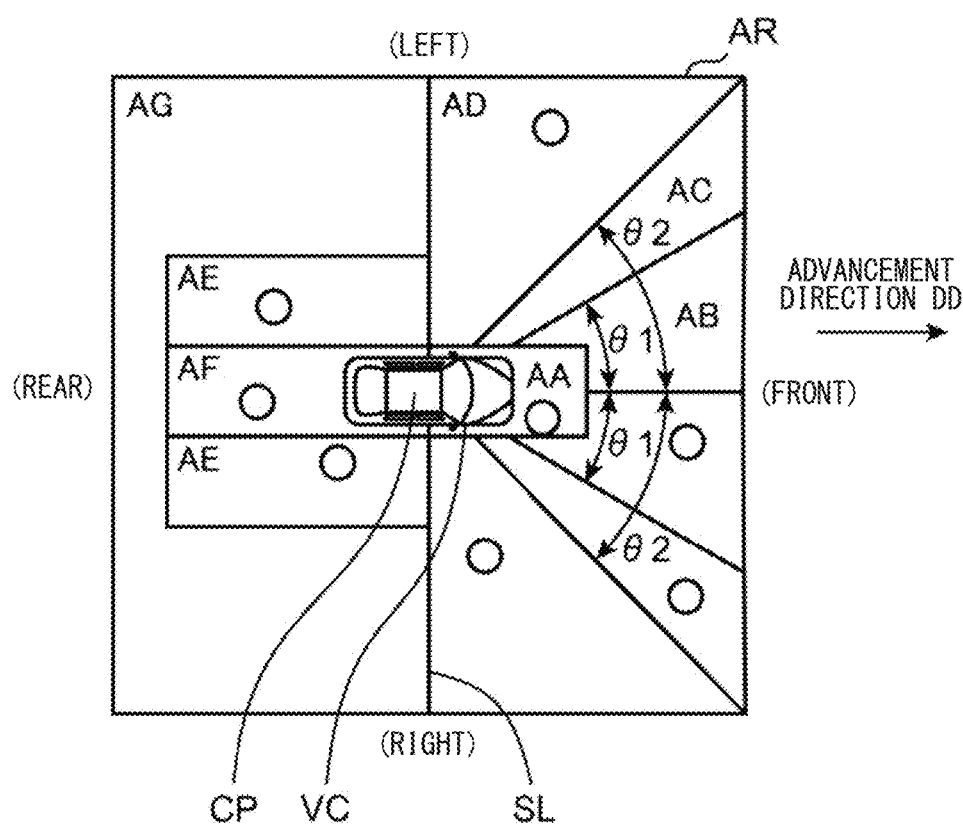
FIG. 3 illustrates areas set around the vehicle provided with the object recognition device.

FIG. 1 is a block diagram showing a configuration of the object recognition device according to the embodiment. FIG. 2 illustrates first to fifth detection units mounted to the vehicle. FIG. 3 illustrates areas set around the vehicle provided with the object recognition device.

An object recognition device S according to the embodiment includes detection units 1 (1-1 to 1-5), a control processing unit 2, and a storage unit 3, as shown in FIG. 1, for example. In the example shown in FIG. 1, the object recognition device S further includes a driving assistance unit 4 for assisting driving for a driver of the vehicle.

The detection units 1 are connected to the control processing unit 2, and detect a thing in a predetermined detection range around the object recognition device S in accordance with control by the control processing unit 2, and output detection results as detection points to the control processing unit 2. The number of detection units 1 may be one, or a plurality of detection units 1 may be provided for making a larger detection range. In the example shown in FIG. 1, the detection units 1 include five first to fifth detection units 1-1 to 1-5 so that the detection ranges cover the entire range around a vehicle VC provided with the object recognition device S. The first to fifth detection units 1-1 to 1-5 are provided at a front and corners of the vehicle VC, as shown in FIG. 2, for example. The first detection unit 1-1 is provided substantially at a center position in a front part of the vehicle VC, and detects a thing around the vehicle VC, in a predetermined first detection range RF centered at a first direction PR which is the advancement direction of the vehicle VC. The second detection unit 1-2 is provided at a front end on one side (e.g., a right front corner) of the vehicle VC, and detects a thing around the vehicle VC, in a predetermined second detection range RRF centered at a second direction FR which is obliquely frontward relative to a vehicle-width direction on the one side. The third detection unit 1-3 is provided at a rear end on the one side (e.g., a right rear corner) of the vehicle VC, and detects a thing around the vehicle VC, in a predetermined third detection range RRB centered at a third direction BR which is obliquely rearward relative to the vehicle-width direction on the one side. The fourth detection unit 1-4 is provided at a front end on another side (e.g., left front corner) of the vehicle VC, and detects a thing around the vehicle VC, in a predetermined fourth detection range RLF centered at a fourth direction FL which is obliquely frontward relative to the vehicle-width direction on the other side. The fifth detection unit 1-5 is provided at a rear end on the other side (e.g., a left rear corner) of the vehicle VC, and detects a thing around the vehicle VC, in a predetermined fifth detection range RLB centered at a fifth direction BL which is obliquely rearward relative to the vehicle-width direction on the other side.

Each of the first to fifth detection units 1-1 to 1-5 is, for example, a radio detection and ranging (radar) device which transmits a predetermined transmission wave and receives a reflection wave of the transmission wave reflected by the thing, to detect the thing, and measures the direction to the thing and the distance to the thing, to measure the position of the thing (the relative position (relative direction and relative distance) of the thing with respect to the own vehicle VC). The transmission wave is an electromagnetic wave in a millimeter-wave band, for example. Each of the first to fifth detection units 1-1 to 1-5 includes, for example, a transmission unit which transmits the millimeter-wave-band transmission wave while scanning each of the first to fifth detection ranges RF, RRF, RRB, RLF, RLB, a reception unit which receives a reflection wave obtained by the transmission wave being reflected by a thing, and a signal processing unit which calculates the direction to the thing and the distance to the thing on the basis of the transmission wave and the reflection wave, to calculate the position of the thing as a detection point. The signal processing unit calculates the direction to the thing from the transmission direction of the transmission wave in scanning for the detection range, and calculates the distance to the thing on the basis of a time difference between the transmission timing of the transmission wave and the reception timing of the reflection wave (time-of-flight (TOF) method). The first to fifth detection units 1-1 to 1-5 are not limited to the above configuration, and may have any appropriate configuration, e.g., may be a device that includes a plurality of reception antennas and calculates the direction to the thing from a phase difference between reflection waves received by the plurality of reception antennas, for example. In the present embodiment, the radar device as an example of the first to fifth detection units 1-1 to 1-5 also calculates the relative velocity of the thing with respect to the own vehicle VC on the basis of Doppler shift of the reflection wave relative to the transmission wave, and outputs the relative velocity to the control processing unit 2.

The first to fifth detection units 1-1 to 1-5 are not limited to the radar device, and may be another device, e.g., a light detection and ranging (LiDAR) device using an infrared laser beam instead of a wave in a millimeter-wave band, an ultrasonic radar using an ultrasonic wave instead of a wave in a millimeter-wave band, or a thing detection device that detects a thing in a predetermined detection range on the basis of a pair of images taken by a stereo camera, for example.

The storage unit 3 is connected to the control processing unit 2, and is a circuit for storing various predetermined programs and various predetermined data in accordance with control by the control processing unit 2. The various predetermined programs include, for example: a control program for controlling each unit 1, 3, 4 of the object recognition device S in accordance with the function thereof; a detection processing program for detecting, as an object, a thing present around the sensor platform (in the present embodiment, the vehicle (own vehicle, own unit) VC as an example, which may be hereinafter referred to as "sensor platform (vehicle VC)") on the basis of detection points detected by the detection units 1 (in the present embodiment, detection points detected by the first to fifth detection units 1-1 to 1-5); and an object processing program for, in a case where processing target objects whose number is a predetermined upper limit value set in advance in a processing target object storage unit 31 are stored in the processing target object storage unit 31 as described later, performing selection storage processing of selecting a processing target object associated with the lowest evaluation value among the processing target objects whose number is the upper limit value and which are stored in the processing target object storage unit 31, determining one object of the selected processing target object and an object newly detected by the object detection unit on the basis of the evaluation value for the selected processing target object and an evaluation value for the object newly detected by the object detection unit, and storing the determined object as the processing target object in the processing target object storage unit 31. The various predetermined data include data needed for executing the programs, such as a detection result of the detection unit 1, the upper limit value, and the processing target object, for example. The storage unit 3 includes, for example, a read only memory (ROM) which is a nonvolatile storage element, an electrically erasable programmable read only memory (EEPROM) which is a rewritable nonvolatile storage element, etc. The storage unit 3 includes a random access memory (RAM) or the like serving as a so-called working memory for the control processing unit 2 and used for storing data generated during execution of the predetermined programs, and the like.

The storage unit 3 functionally includes the processing target object storage unit 31. The processing target object storage unit 31 stores the object as a processing target object, with a number thereof being the predetermined upper limit value or smaller, such that the processing target object is associated with an evaluation value for storing and keeping the processing target object, the evaluation value being determined in accordance with the situation of the object relative to the sensor platform (vehicle VC). Therefore, in the storage unit 3, a storage area where processing target objects whose number is the upper limit value can be stored together with evaluation values associated therewith is provided as the processing target object storage unit 31, in initial processing, for example. The object recognition device S repeatedly recognizes an object periodically at predetermined time intervals (sampling intervals). The upper limit value is the maximum number of processing target objects that can be stored in the processing target object storage unit 31 of the storage unit 3 during the above repeated recognition of an object, and is set as appropriate in advance. The upper limit value is set at 5, 10, etc., in accordance with, for example, a configuration of driving assistance by the driving assistance unit 4 using an object recognition result, or the like. The processing target object is, in other words, an object stored in the processing target object storage unit 31, and is one of objects that are targets to be subjected to the selection storage processing.

The evaluation values represent positions (order) of objects when they are arranged in a priority order for preferentially storing and keeping them in the processing target object storage unit 31, and are determined in accordance with the situations of objects relative to the sensor platform (vehicle VC). That is, if the situation of the object relative to the sensor platform (vehicle VC) is determined, the evaluation value therefor is also determined. In a case where there are a plurality of objects and not all of them can be stored, objects having high evaluation values are preferentially stored in the processing target object storage unit 31. In the present embodiment, the evaluation value to be associated with the object includes a plurality of evaluation values based on a plurality of criteria that are different kinds.

More specifically, there are three criteria that are three kinds. A first criterion involves a first evaluation value determined on the basis of a direction and a traveling state of an object relative to the sensor platform (vehicle VC). In more detail, the first criterion is a criterion involving "approach", "front", and "other", as the first evaluation value.

The area around the own vehicle VC is divided into a plurality of areas, e.g., seven first to seventh areas AA to AG as shown in FIG. 3, in order to determine the first evaluation value on the basis of the direction of an object relative to the sensor platform (vehicle VC), for example. The first area AA is a rectangular area having substantially the same width as the width of the vehicle VC and extending from the front end of the vehicle VC to a predetermined distance (front-section distance). The second area AB is a triangular area (or sector-shaped area) spreading frontward and having a vertex at a point (center point) CP which is the intersection of the vehicle-length direction and the vehicle-width direction of the vehicle VC and is the center position in the vehicle-length direction (or the center position of the outer contour rectangular shape of the vehicle VC in a plan view of the vehicle VC), and both sides (both right and left sides) of the triangular shape (or sector shape) on one side and another side in the vehicle-width direction are opened by equal predetermined first angles θ1 with respect to an advancement direction DD (θ1>0), excluding an area overlapping the first area AA. The third area AC is a triangular area (or sector-shaped area) spreading frontward and having a vertex at the center point CP, and both left and right sides of the triangular shape (or sector shape) are opened by equal predetermined second angles θ2 with respect to the advancement direction DD (θ2>θ1), excluding an area overlapping the first and second areas AA and AB. The fourth area AD is an area frontward from a line (front-rear division line) SL passing the center point CP and parallel to the vehicle-width direction, excluding an area overlapping the first to third areas AA, AB, and AC. The sixth area AF is a rectangular area having substantially the same width as the width of the vehicle VC and extending from the rear end of the vehicle VC to a predetermined distance (rear-section distance). The fifth areas AE are rectangular areas rearward from the front-rear division line SL and located on both of one side and another side in the vehicle-width direction of the sixth area AF. The seventh area AG is an area rearward from the front-rear division line SL, excluding an area overlapping the fifth and sixth areas AE and AF.

In a case where there is an object in one of the first and second areas AA and AB relative to the sensor platform (vehicle VC), the first evaluation value based on the first criterion is "front" which indicates that the object is located frontward relative to the sensor platform (vehicle VC).

In driving assistance for automatically actuating a brake so as to mitigate collision damage (collision mitigation braking assistance) or driving assistance for automatically controlling traveling of the own vehicle VC so as to follow another frontward vehicle while keeping a predetermined inter-vehicle distance (following-traveling assistance), an object as a target is likely to appear in the first area AA or the second area AB, and by setting directions in the first and second areas AA and AB as "front", the target object can be more assuredly set as a processing target object. The second angle θ2 may be set at approximately 45 degrees in consideration of another vehicle that can be a target in the collision mitigation braking assistance at an intersection, for example.

In a case where the traveling state of the object relative to the sensor platform (vehicle VC) is such a state of approaching the sensor platform (vehicle VC) at a velocity not smaller than a predetermined relative velocity threshold, the first evaluation value based on the first criterion is "approach" which indicates that the object is approaching the sensor platform (vehicle VC).

In a case where the first evaluation value based on the first criterion is neither "front" nor "approach", the first evaluation value based on the first criterion is "other".

The first evaluation value based on the first criterion is defined in advance. For example, the first evaluation value based on the first criterion is defined as appropriate in advance in consideration of a configuration of driving assistance by the driving assistance unit 4 using an object recognition result, or the like. For example, the first evaluation value decreases in an order of "approach", "front", and then "other" ("approach">"front">"other"). In the present embodiment, the first evaluation value is determined on the basis of a first minimum keeping value na0, a second minimum keeping value nb0, a total number (first total number) na of objects corresponding to "approach", and a total number (second total number) nb of objects corresponding to "front", among the processing target objects stored in the processing target object storage unit 31 and an object newly detected by a detection processing unit 22. As described later, the first minimum keeping value na0 is a minimum number of processing target objects that should be stored and kept in the processing target object storage unit 31, in a group of objects for which the first evaluation values are "approach", and the second minimum keeping value nb0 is a minimum number of processing target objects that should be stored and kept in the processing target object storage unit 31, in a group of objects for which the first evaluation values are "front". More specifically, for example, the first evaluation value is defined, from the highest one to the lowest one, in the following order: the first evaluation value for "approach" in a case where the first total number na is the first minimum keeping value na0 or smaller ("approach" first evaluation value|na≤na0), the first evaluation value for "front" in a case where the second total number nb is the second minimum keeping value nb0 or smaller ("front" first evaluation value|nb≤nb0), the first evaluation value for "other" ("other" first evaluation value), the first evaluation value for "front" in a case where the second total number nb is greater than the second minimum keeping value nb0 ("front" first evaluation value|nb>nb0), and then the first evaluation value for "approach" in a case where the first total number na is greater than the first minimum keeping value na0 ("approach" first evaluation value|na>na0) (Inequality 1: ""approach" first evaluation value|na≤na0">""front" first evaluation value|nb≤nb0">""other" first evaluation value">""front" first evaluation value|nb>nb0">""approach" first evaluation value|na>na0"). As described above, the first evaluation value is defined on the basis of the magnitude relationship between the first total number na and the first minimum keeping value na0 and the magnitude relationship between the second total number nb and the second minimum keeping value nb0, whereby a configuration of driving assistance by the driving assistance unit 4 using an object recognition result, or the like, can be taken into consideration, and during the repeated object recognition, the objects corresponding to "approach" can be kept such that the number thereof is the first minimum keeping value na0 or greater, and the objects corresponding to "front" can be kept such that the number thereof is the second minimum keeping value nb0 or greater. Meanwhile, during the repeated object recognition, extra objects above the first minimum keeping value na0 among the objects corresponding to "approach" can be preferentially removed, and extra objects above the second minimum keeping value nb0 among objects corresponding to "front" can be preferentially removed, so that the storage area allotted to the processing target object storage unit 31 can be effectively utilized.

As the second criterion, in the present embodiment, there are two kinds, i.e., a time to collision of the object with the sensor platform (vehicle VC) (second A criterion) and a distance of the object from the sensor platform (vehicle VC) (second B criterion), and these are selectively used depending on the first evaluation value based on the first criterion as described later. In a case where the second criterion is the time to collision, the second evaluation value (the second A evaluation value based on the second A criterion) is defined in advance and becomes lower as the time to collision becomes longer. In a case where the second criterion is the distance, the second evaluation value (the second B evaluation value based on the second B criterion) is defined in advance and becomes lower as the distance becomes farther (longer or greater). The time to collision (TTC) is a predicted time until the own vehicle VC collides with another vehicle, and is calculated by dividing a distance DT of the object from the sensor platform (vehicle VC) by a relative velocity RS of the sensor platform (vehicle VC) with respect to the object (TTC=DT/RS).

The control processing unit 2 is a circuit for controlling each unit 1, 3, 4 of the object recognition device S in accordance with the function thereof and recognizing a thing present in a predetermined range around the sensor platform (vehicle VC). The control processing unit 2 is formed by a central processing unit (CPU) and a peripheral circuit, for example. The control processing unit 2 functionally includes a control unit 21, the detection processing unit 22, and an object processing unit 23, by the control processing program being executed.

The control unit 21 controls each unit 1, 3, 4 of the object recognition device S in accordance with the function thereof, thereby performing overall control of the object recognition device S.

The detection processing unit 22 detects, as an object, a thing present around the sensor platform (vehicle VC), on the basis of detection points detected by the detection units 1 (in the present embodiment, detection points detected by the first to fifth detection units 1-1 to 1-5). As a method for detecting an object on the basis of detection points, known common means can be used. Normally, a plurality of detection points are detected from one thing, depending on special resolutions of the detection units 1, the size of the thing, the distances from the detection units 1 to the thing, and the like. Therefore, for example, the detection processing unit 22 clusters one or a plurality of detection points detected by the first to fifth detection units 1-1 to 1-5, to obtain a cluster (group) of the detection points as an object. Alternatively, in periodic repeated object recognition processing, the size and the position of an object changes through at least one of movement of the sensor platform (vehicle VC) and movement of the object thing, and can be predicted from observation data of the distance, the relative velocity, and the angle of the object in the past. Therefore, for example, the detection processing unit 22 clusters one or a plurality of detection points detected by the first to fifth detection units 1-1 to 1-5, to obtain a cluster of the detection points as an object candidate, and produces observation data which is thing state information including the size and the position of the obtained object candidate. Then, the detection processing unit 22 produces prediction data by predicting the thing state information on the basis of past observation data, and determines whether or not the object represented by the observation data and the object represented by the prediction data are the same, through correlation processing between the observation data and the prediction data. As a result of the determination, if it is determined that they are the same, the detection processing unit 22 associates the object candidate represented by the observation data with the object represented by the prediction data and sets the object candidate as the object in the observation data. On the other hand, as a result of the determination, if it is determined that they are not the same, the detection processing unit 22 sets the object candidate represented by the observation data, as a new object in the observation data. In this way, the object (thing) is tracked (trailed) through every periodic repetition of the object recognition processing.

In the present embodiment, the first to fifth detection units 1-1 to 1-5 and the detection processing unit 22 form an object detection unit OD, and correspond to an example of an object detection unit which detects, as an object, a thing present around the sensor platform.

Then, the detection processing unit 22 temporarily stores, in the storage unit 3, the detected object so as to be associated with an evaluation value determined in accordance with the situation of the object relative to the sensor platform (vehicle VC). In a case where a plurality of objects are detected, the plurality of objects are each stored.

More specifically, in the first criterion, for example, in a case where the traveling state of the object relative to the sensor platform (vehicle VC) is such a state of approaching the own vehicle VC at a velocity not smaller than the relative velocity threshold, the first evaluation value is "approach", and the detected object is stored in the storage unit 3 so as to be associated with "approach". As another example, in a case where the position of the detected object is in at least one of the first and second areas AA and AB, the first evaluation value is "front", and the detected object is stored in the storage unit 3 so as to be associated with "front". As another example, in a case corresponding to neither "approach" nor "front", the first evaluation value is "other", and the detected object is stored in the storage unit 3 so as to be associated with "other". In the second A criterion, the detection processing unit 22 calculates a time to collision of the object with the sensor platform (vehicle VC), and the detected object is stored in the storage unit 3 so as to be associated with the calculated time to collision of the object (the value of the time to collision) as the second A evaluation value. In the second B criterion, the detection processing unit 22 calculates the distance to the object from the sensor platform (vehicle VC), and the detected object is stored in storage unit 3 so as to be associated with the calculated distance to the object (the value of the distance) as the second B evaluation value. In the present embodiment, as described later, in a case where the first evaluation value is "approach", the time to collision which is the second A evaluation value is used, and therefore the time to collision may be calculated for only the object corresponding to "approach".

In a case where the processing target objects whose number is the upper limit value are stored in the processing target object storage unit 31, the object processing unit 23 performs selection storage processing of selecting the processing target object associated with the lowest evaluation value among the processing target objects whose number is the upper limit value and which are stored in the processing target object storage unit 31, determining one object of the selected processing target object and an object newly detected by the detection processing unit 22 on the basis of the evaluation value for the selected processing target object and the evaluation value for the object newly detected by the object detection unit, and storing the determined object as the processing target object in the processing target object storage unit 31. In a case where a plurality of objects are newly detected by the detection processing unit 22, the object processing unit 23 performs the selection storage processing for the plurality of objects one by one sequentially. The object newly detected by the detection processing unit 22 is the object detected in the object recognition processing at present in periodic repetitions of the object recognition processing, and is determined by the tracking, for example.

The object processing unit 23 is configured to perform processing based on Inequality 1. More specifically, in the selection of the processing target object associated with the lowest evaluation value, the object processing unit 23 extracts processing target objects as candidates for the selection by the first evaluation value based on the first criterion among the plurality of criteria, from the processing target objects whose number is the upper limit value and which are stored in the processing target object storage unit 31, and selects the processing target object associated with the lowest evaluation value, from the processing target objects extracted as the candidates for the selection, on the basis of the second evaluation value based on the second criterion different from the first criterion among the plurality of criteria. More specifically, in the extraction of the processing target objects as the candidates for the selection, the object processing unit 23 divides the processing target objects stored in the processing target object storage unit 31 and the object newly detected by the detection processing unit 22 into a plurality of groups for respective first evaluation values based on the first criterion, and performs the extraction for each group. In more detail, in the extraction for each group, in a case where the group is imparted with a predetermined minimum keeping value, the object processing unit 23 compares the number of the processing target objects stored in the processing target object storage unit 31 with the minimum keeping value, and as a result of the comparison, if the number of the processing target objects stored in the processing target object storage unit 31 is the minimum keeping value or smaller, the object processing unit 23 invalidates the extraction. In a case where the extraction is invalidated, in the selection storage processing, the object processing unit 23 does not execute selection storage processing for a case where the extraction is not invalidated. The minimum keeping value is the minimum number of the processing target objects that should be stored and kept in the processing target object storage unit 31, and in the present embodiment, the minimum keeping values are set for the group of objects for which the first evaluation values are "approach" and the group of objects for which the first evaluation values are "front". For the group of objects for which the first evaluation values are "approach", the minimum keeping value (first minimum keeping value) na0 is set, and for the group of objects for which the first evaluation values are "front", the minimum keeping value (second minimum keeping value) nb0 is set.

For example, the groups are classified for "approach", "front", and "other". In the group for "approach", processing target objects associated with "approach" are extracted as the candidates for the selection, from the processing target objects whose number is the upper limit value and which are stored in the processing target object storage unit 31, and the processing target object associated with the lowest evaluation value is selected from the processing target objects extracted as the candidates for the selection, on the basis of the second A evaluation value (the value of the time to collision) based on the second A criterion (the time to collision). That is, the object having the lowest second A evaluation value is selected. Here, in a case where the total number na of the processing target objects associated with "approach" is the first minimum keeping value na0 or smaller, the extraction is invalidated. Thus, the processing target object associated with "approach" is at least stored and kept in the processing target object storage unit 31.

Then, in the determination of one object of the selected processing target object and the object newly detected by the detection processing unit 22, firstly, the object processing unit 23 determines the one object by the first evaluation value based on the first criterion, and secondly, in a case where the one object is not successfully determined by the first evaluation value based on the first criterion, the object processing unit 23 determines the one object by the second evaluation value based on the second criterion. More specifically, in a case where the first evaluation value based on the first criterion for the selected processing target object is "approach" and the first evaluation value based on the first criterion for the object newly detected by the detection processing unit 22 is "approach", so that the one object cannot be determined by the first evaluation value based on the first criterion, the object processing unit 23 determines the one object by the second A evaluation value based on the second A criterion. In a case where the first evaluation value based on the first criterion for the selected processing target object is "front" and the first evaluation value based on the first criterion for the object newly detected by the detection processing unit 22 is "front", so that the one object cannot be determined by the first evaluation value based on the first criterion, the object processing unit 23 determines the one object by the second B evaluation value (the value of the distance) based on the second B criterion (distance). In a case where the first evaluation value based on the first criterion for the selected processing target object is "other" and the first evaluation value based on the first criterion for the object newly detected by the object detection unit is "other", so that the one object cannot be determined by the first evaluation value based on the first criterion, the object processing unit 23 determines the one object by the second B evaluation value based on the second B criterion.

The driving assistance unit 4 is connected to the control processing unit 2 and is a device for assisting driving in accordance with control by the control processing unit 2. In the present embodiment, the driving assistance unit 4 assists driving on the basis of the processing target objects stored in the processing target object storage unit 31. As driving assistance technology, various technologies are developed, and for example, an advanced driver-assistance system (ADAS) is developed and known. In the driving assistance unit 4, such a driving assistance technology developed as an ADAS and involving an object can be used. For example, the collision mitigation braking assistance technology, the following-traveling assistance technology, driving assistance (rearward-thing-presence warning assistance) for warning presence of another thing (e.g., other vehicle) in an area that can be a blind spot for a driver, and the like can be used. The driving assistance unit 4 to which the collision mitigation braking assistance technology is applied operates as follows: for example, in a case where the time to collision of the object as another thing has become a predetermined threshold (first determination threshold) or smaller, the driving assistance unit 4 issues a collision warning by, for example, an alarm sound or a warning light, and in a case where the time to collision of the object has become a predetermined threshold or smaller (second determination threshold; first determination threshold>second determination threshold), the driving assistance unit 4 operates a brake device of the sensor platform (vehicle VC) to decelerate or stop the sensor platform (vehicle VC). The driving assistance unit 4 to which the following-traveling assistance technology is applied controls devices related to an accelerator, a brake, and a steering wheel so as to perform following-traveling while keeping the inter-vehicle distance to another vehicle (an object as another vehicle) traveling in front of the sensor platform (vehicle VC), at a predetermined distance, thus controlling the velocity and steering of the sensor platform (vehicle VC). The driving assistance unit 4 to which the technology of rearward-thing-presence warning assistance is applied issues a warning indicating that another thing is present rearward, by, for example, an alarm sound or a warning light, in a case where an object as the other thing is detected in the fifth area AE, in the example shown in FIG. 3.

The control processing unit 2 and the storage unit 3 in the object recognition device S as described above can be configured by a computer called an electronic control unit (ECU).

Figure 4:
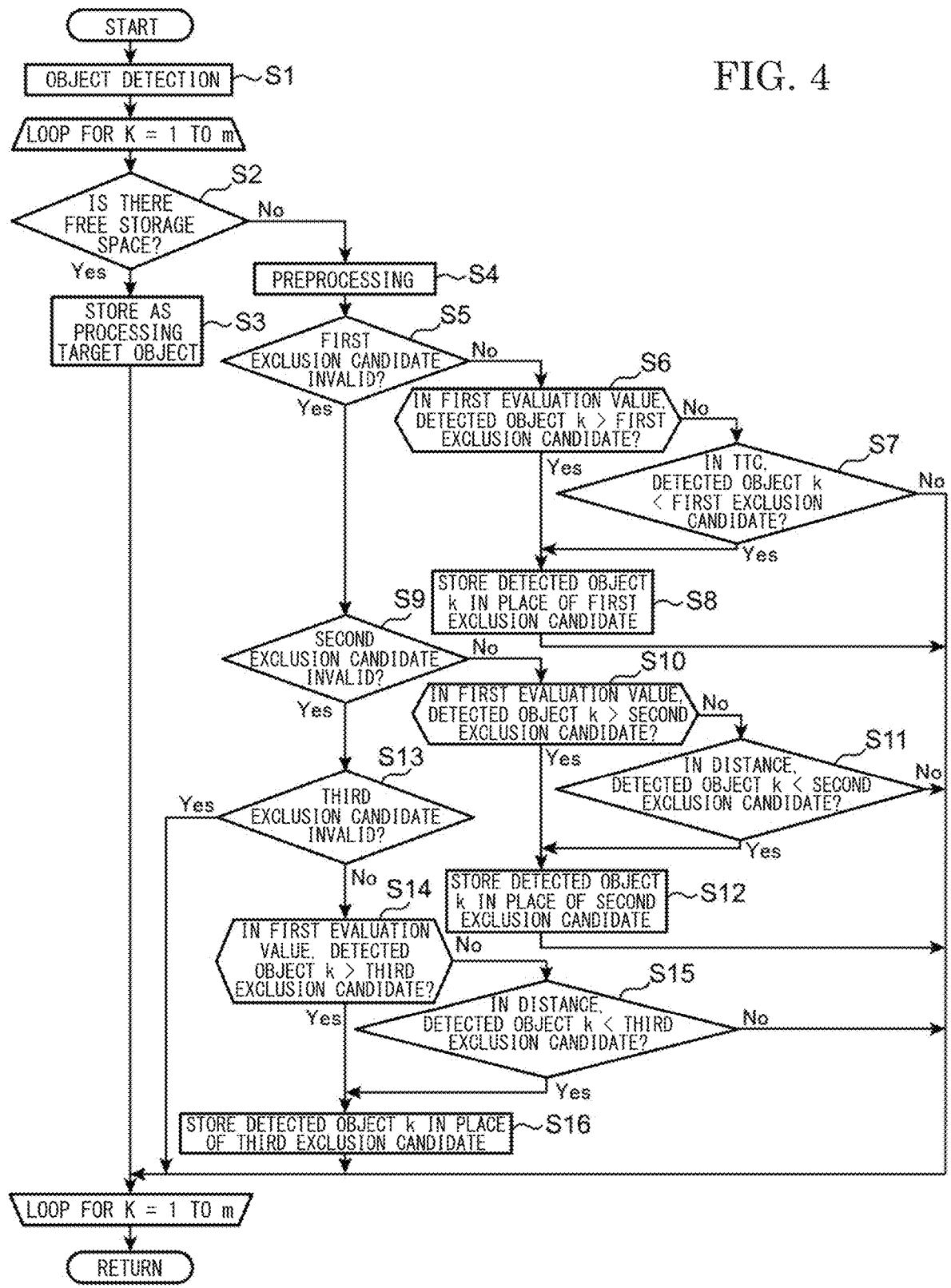
FIG. 4 is a flowchart showing operation in storing an object that is a processing target in the object recognition device.
Figure 5:
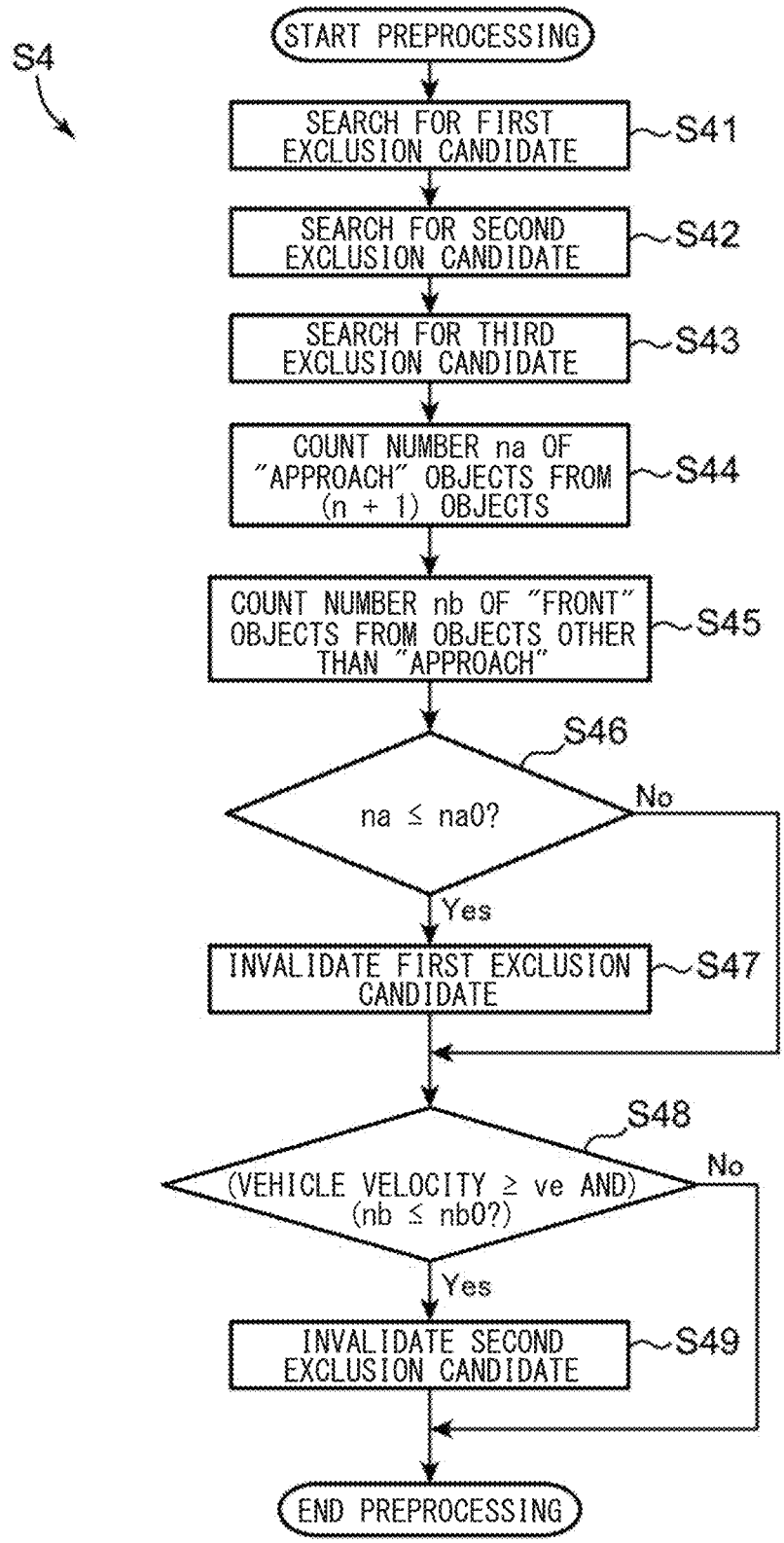
FIG. 5 is a flowchart of preprocessing in the flowchart shown in FIG. 4.

Next, operation in the present embodiment will be described. FIG. 4 is a flowchart showing operation in storing a processing target object in the object recognition device. FIG. 5 is a flowchart of preprocessing in the flowchart shown in FIG. 4.

When the sensor platform (vehicle VC) starts to operate, the object recognition device S executes initialization of necessary units and starts to operate them. Through execution of the control processing program therefor, the control processing unit 2 functionally forms the control unit 21, the detection processing unit 22, and the object processing unit 23, and the storage unit 3 forms a storage area as the processing target object storage unit 31 with the upper limit value n.

In recognition for a thing around the sensor platform (vehicle VC), the object recognition device S repeatedly executes the following operations shown in FIG. 4 at a predetermined sampling cycle.

In FIG. 4, in processing at present, the object recognition device S acquires detection points detected by the first to fifth detection units 1-1 to 1-5, from the first to fifth detection units 1-1 to 1-5, detects a thing present around the sensor platform (vehicle VC) as an object by the detection processing unit 22 of the control processing unit 2, and temporarily stores the detected object in the storage unit 3 so as to be associated with an evaluation value, i.e., in the present embodiment, the first evaluation value based on the first criterion and the second evaluation value based on the second criterion (the second A evaluation value and the second B evaluation value based on the second A criterion and the second B criterion) (S1). Here, in the present embodiment, among the detected objects, an object determined to be a newly detected object as a result of tracking is assigned with a number (identification number) k as an identifier for specifying and identifying the object, and the assigned identification number k is also stored so as to be associated with the newly detected object when the object is temporarily stored in the storage unit 3. The identification number k is an integer from 1 to m which is the number of objects determined to be newly detected objects in step S1 (k=1, . . . , m). In a case where the number of objects determined to be newly detected objects in step S1 is one, m is 1, and in a case where there are a plurality of objects determined to be newly detected objects in step S1, m is an integer greater than 1.

The object processing unit 23 of the control processing unit 2 performs, as the selection storage processing, processing in steps S2 to S16 below, on each object for the identification number k from the object for the identification number k=1 to the object for the identification number k=m, one by one sequentially.

In step S2, the object recognition device S determines, by the object processing unit 23, whether or not a free storage area where an object can be stored as a processing target object is present in the processing target object storage unit 31. More specifically, the object processing unit 23 determines whether or not the processing target objects whose number is the upper limit value n are stored in the processing target object storage unit 31. As a result of the determination, if the processing target objects whose number is smaller than the upper limit value n are stored in the processing target object storage unit 31, it is determined that the free storage area is present (Yes), and then the object processing unit 23 executes step S3 and finishes the selection storage processing on the object for the identification number k. Accordingly, if the identification number k is smaller than m, the selection storage processing is executed on the object for the next identification number k+1, and on the other hand, if the identification number k is m, the processing at present is ended. As a result of the determination, if the processing target objects whose number is the upper limit value n are stored in the processing target object storage unit 31, it is determined that there is no free storage area (No), and then the object processing unit 23 executes step S4.

In step S3, since the free storage area is present, the object processing unit 23 stores the object for the identification number k as a processing target object in the processing target object storage unit 31 so as to be associated with the evaluation value (in the present embodiment, the first and second evaluation values).

In a process from step S4 to step S16 described later, the object processing unit 23 performs the selection storage processing of selecting the processing target object associated with the lowest evaluation value among the processing target objects whose number is the upper limit value n and which are stored in the processing target object storage unit 31, determining one object of the selected processing target object and an object newly detected by the detection processing unit 22 on the basis of the evaluation value for the selected processing target object and the evaluation value for the object newly detected by the detection processing unit 22, and storing the determined object as the processing target object in the processing target object storage unit 31.

In the selection storage processing, first, the object processing unit 23 executes preprocessing S4 (S41 to S49) shown in FIG. 5. In the preprocessing S4, in the selection of the processing target object associated with the lowest evaluation value, the object processing unit 23 extracts processing target objects as candidates for the selection by the first evaluation value based on the first criterion, from the processing target objects whose number is the upper limit value n and which are stored in the processing target object storage unit 31, and selects the processing target object associated with the lowest evaluation value, from the processing target objects extracted as the candidates for selection, on the basis of the second evaluation value based on the second criterion. Here, in the extraction of the processing target objects as the candidates for the selection, the object processing unit 23 divides the processing target objects stored in the processing target object storage unit 31 and the object newly detected by the detection processing unit 22 into a plurality of groups by each first evaluation value based on the first criterion, and performs the extraction for each group. Then, in the extraction for each group, in a case where the group is imparted with the minimum keeping value, the object processing unit 23 compares the number of the processing target objects stored in the processing target object storage unit 31 with the minimum keeping value, and as a result of the comparison, if the number of the processing target objects stored in the processing target object storage unit 31 is the minimum keeping value or smaller, the object processing unit 23 invalidates the extraction.

More specifically, in FIG. 5, firstly, the object processing unit 23 searches for a first exclusion candidate on the basis of the evaluation values based on the first and second criteria, in the group ("approach" group) of objects for which the first evaluation values are "approach" (S41). In more detail, the object processing unit 23 extracts processing target objects associated with "approach" from the processing target objects whose number is the upper limit value n and which are stored in the processing target object storage unit 31, and determines, as a first exclusion candidate, the processing target object associated with the lowest evaluation value among the extracted processing target objects, on the basis of the second evaluation value based on the second criterion. Here, since the first evaluation value is "approach", the time to collision which is the second A criterion is used as the second criterion, and the object processing unit 23 determines the processing target object indicating the greatest time to collision, as the first exclusion candidate. Regarding the object approaching the sensor platform (vehicle VC), a time until collision therewith is important and therefore the time to collision is used as the second criterion. The first exclusion candidate is a processing target object to be a candidate for the selection regarding "approach", in selecting the processing target object associated with the lowest evaluation value among the processing target objects whose number is the upper limit value n and which are stored in the processing target object storage unit 31. The first exclusion candidate is the processing target object associated with the lowest evaluation value in the group for "approach" as long as the extraction thereof is valid without being invalidated.

Next, the object processing unit 23 searches for a second exclusion candidate on the basis of the evaluation values based on first and second criteria, in the group ("front" group) of objects for which the first evaluation values are "front" (S42). In more detail, the object processing unit 23 extracts processing target objects associated with "front" from the processing target objects whose number is the upper limit value n and which are stored in the processing target object storage unit 31, and determines, as a second exclusion candidate, the processing target object associated with the lowest evaluation value among the extracted processing target objects, on the basis of the second evaluation value based on the second criterion. Here, since the first evaluation value is "front", the distance which is the second B criterion is used as the second criterion, and the object processing unit 23 determines the processing target object indicating the greatest distance, as the second exclusion candidate. Regarding an object in front of the sensor platform (vehicle VC), the inter-vehicle distance thereto is important and therefore the distance is used as the second criterion. The second exclusion candidate is a processing target object to be a candidate for the selection regarding "front", and is the processing target object associated with the lowest evaluation value in the group for "front" as long as the extraction thereof is valid without being invalidated.

Next, the object processing unit 23 searches for a third exclusion candidate on the basis of the evaluation values based on the first and second criteria, in the group ("other" group) of objects for which the first evaluation values are "other" (S43). In more detail, the object processing unit 23 extracts processing target objects associated with "other" from the processing target objects whose number is the upper limit value n and which are stored in the processing target object storage unit 31, and determines, as a third exclusion candidate, the processing target object associated with the lowest evaluation value among the extracted processing target objects, on the basis of the second evaluation value based on the second criterion. Here, since the first evaluation value is "other", the distance which is the second B criterion is used as the second criterion, and the object processing unit 23 determines the processing target object indicating the greatest distance, as the third exclusion candidate. The third exclusion candidate is a processing target object to be a candidate for the selection regarding "other", and in the present embodiment, is the processing target object associated with the lowest evaluation value in the group for "other" as long as the extraction thereof is valid without being invalidated.

Next, in order to perform comparison with the first minimum keeping value na0 imparted to the "approach" group, the object processing unit 23 counts the number of objects associated with "approach", among the processing target objects whose number is the upper limit value n and which are stored in the processing target object storage unit 31 and the object for the identification number k newly detected by the detection processing unit 22, thus obtaining the first total number na (S44).

Next, in order to perform comparison with the second minimum keeping value nb0 imparted to the "front" group, the object processing unit 23 counts the number of objects associated with "front" among the processing target objects whose number is the upper limit value n and which are stored in the processing target object storage unit 31 and the object for the identification number k newly detected by the detection processing unit 22, thus obtaining the second total number nb (S45). That is, objects associated with "front" are counted from the objects other than the objects associated with "approach" after execution of step S44, whereby the second total number nb is obtained.

Next, the object processing unit 23 determines whether or not the first total number na is the first minimum keeping value na0 or smaller (na≤na0?, S46). As a result of the determination, if the first total number na is the first minimum keeping value na0 or smaller (Yes), the object processing unit 23 executes step S47 and then executes step S48. On the other hand, as a result of the determination, if the first total number na is not the first minimum keeping value na0 or smaller (No), the object processing unit 23 executes step S48.

In step S47, the object processing unit 23 sets "invalidation of extraction" for the first exclusion candidate so as to invalidate extraction for the first exclusion candidate in the "approach" group. For example, a flag indicating whether or not "invalidation of extraction" is set for the first exclusion candidate (first invalidation flag) is associated with the first exclusion candidate and stored in the storage unit 3. The first invalidation flag indicates that "invalidation of extraction" is set, by "1", and indicates that "invalidation of extraction" is not set, by "0", for example. By setting of "invalidation of extraction" for the first exclusion candidate in the "approach" group, irrespective of the first evaluation value for the object for the identification number k newly detected by the detection processing unit 22, the processing target object associated with "approach" is stored and kept in the processing target object storage unit 31 in the processing on the object for the identification number k. In the present embodiment, also in a case where there is no object in the "approach" group, the first invalidation flag is set at "1", whereby information processing for the first exclusion candidate is reduced.

In step S48, the object processing unit 23 determines whether or not the second total number nb is the second minimum keeping value nb0 or smaller (nb≤nb0?). As a result of the determination, if the second total number nb is the second minimum keeping value nb0 or smaller (Yes), the object processing unit 23 executes step S49, thus ending the preprocessing S4, and then executes step S5 shown in FIG. 4 as described above. On the other hand, as a result of the determination, if the second total number nb is not the second minimum keeping value nb0 or smaller (No), the object processing unit 23 ends the preprocessing S4 and then executes step S5.

In step S49, the object processing unit 23 sets "invalidation of extraction" for the second exclusion candidate so as to invalidate extraction for the second exclusion candidate in the "front" group. For example, a flag indicating whether or not "invalidation of extraction" is set for the second exclusion candidate (second invalidation flag) as with the first invalidation flag is associated with the second exclusion candidate and stored in the storage unit 3. By setting of the "invalidation of extraction" for the second exclusion candidate in the "front" group, irrespective of the first evaluation value for the object for the identification number k newly detected by the detection processing unit 22, the processing target object associated with "front" is stored and kept in the processing target object storage unit 31 in the processing on the object for the identification number k. In the present embodiment, also in a case where there is no object in the "front" group, the second invalidation flag is set at "1", whereby information processing for the second exclusion candidate is reduced.

With reference to FIG. 4 again, in step S5 subsequent to the preprocessing S4, the object processing unit 23 determines whether or not "invalidation of extraction" is set for the first exclusion candidate. As a result of the determination, if "invalidation of extraction" is set for the first exclusion candidate (Yes), the object processing unit 23 executes step S9 (therefore, each processing in steps S6 to S8 is not executed). On the other hand, as a result of the determination, if "invalidation of extraction" is not set for the first exclusion candidate (No), the object processing unit 23 executes step S6.

In this step S6, and step S7 described later, in the determination of one object of the selected processing target object and the object for the identification number k newly detected by the detection processing unit 22, firstly, the object processing unit 23 determines the one object by the first evaluation value based on the first criterion, and secondly, in a case where the one object is not successfully determined by the first evaluation value based on the first criterion, the object processing unit 23 determines the one object by the second evaluation value based on the second criterion. Also in steps S10 and S11 described later and in steps S14 and S15 described later, the object processing unit 23 executes processing similarly. In steps S6 and S7, the object processing unit 23 executes processing for a case where the first evaluation value for the first exclusion candidate is ""approach" first evaluation value|na>na0". In steps S10 and S11, the object processing unit 23 executes processing for a case where the first evaluation value for the second exclusion candidate is ""front" first evaluation value|nb>nb0". In steps S14 and S15, the object processing unit 23 executes processing for a case where the first evaluation value for the third exclusion candidate is ""other" first evaluation value".

More specifically, in step S6, the object processing unit 23 determines whether or not the first evaluation value for the object for the identification number k (detected object k) newly detected by the detection processing unit 22 is higher than the first evaluation value for the first exclusion candidate. Determination for the first evaluation values is performed on the basis of the above Inequality 1. As a result of the determination, if the first evaluation value for the detected object k is higher than the first evaluation value for the first exclusion candidate, i.e., if the first evaluation value for the first exclusion candidate is lower than the first evaluation value for the detected object k (Yes), the object processing unit 23 executes step S8. On the other hand, as a result of the determination, if the first evaluation value for the detected object k is not higher than the first evaluation value for the first exclusion candidate (No), the object processing unit 23 executes step S7. That is, in step S6, since extraction for the first exclusion candidate is not invalid, determination is performed in accordance with ""other" first evaluation value">""front" first evaluation value|nb>nb0">""approach" first evaluation value|na>na0" in Inequality 1. Thus, a case where the first evaluation value for the detected object k is "other" or "front" is determined to be a case of "Yes", to execute step S8, and a case where the first evaluation value for the detected object k is "approach" is determined to be a case of "No", to execute step S7.

In step S7, since determination has not been successfully made by comparison of the first evaluation values based on the first criterion, comparison of the second evaluation values based on the second criterion is to be performed, so that the object processing unit 23 determines whether or not the second evaluation value for the detected object k is higher than the second evaluation value for the first exclusion candidate. Step S7 is executed in a case where the first evaluation value is "approach". Therefore, the time to collision which is the second A criterion is used as the second criterion, and the value of the time to collision which is the second A evaluation value is used as the second evaluation value. As a result of the determination, if the second A evaluation value for the detected object k is higher than the second A evaluation value for the first exclusion candidate, i.e., if the time to collision of the detected object k is shorter than the time to collision of the first exclusion candidate and therefore the second A evaluation value for the first exclusion candidate is lower than the second A evaluation value for the detected object k (Yes), the object processing unit 23 executes step S8 and then ends the selection storage processing on the object for the identification number k. On the other hand, as a result of the determination, if the second A evaluation value for the detected object k is not higher than the second A evaluation value for the first exclusion candidate (No), the object processing unit 23 ends the selection storage processing on the object for the identification number k.

In step S8, the object processing unit 23 stores, as the processing target object, the object for the identification number k (detected object k) newly detected by the detection processing unit 22, in place of the object that is the first exclusion candidate, in the processing target object storage unit 31. Therefore, in the selection storage processing on the object for the next identification number k+1, the detected object k stored in the processing target object storage unit 31 in place of the object that is the first exclusion candidate becomes one of the processing target objects whose number is the upper limit value n and which are stored in the processing target object storage unit 31. Step S12 and step S16 described later also provide the same effects as in step S8.

In step S9, the object processing unit 23 determines whether or not "invalidation of extraction" is set for the second exclusion candidate. As a result of the determination, if "invalidation of extraction" is set for the second exclusion candidate (Yes), the object processing unit 23 executes step S13 (therefore, each processing in steps S10 to S12 is not executed). On the other hand, as a result of the determination, if "invalidation of extraction" is not set for the second exclusion candidate (No), the object processing unit 23 executes step S10.

In step S10, the object processing unit 23 determines whether or not the first evaluation value for the object for the identification number k (detected object k) newly detected by the detection processing unit 22 is higher than the first evaluation value for the second exclusion candidate. Determination for the first evaluation values is performed on the basis of the above Inequality 1. As a result of the determination, if the first evaluation value for the detected object k is higher than the first evaluation value for the second exclusion candidate, i.e., if the first evaluation value for the second exclusion candidate is lower than the first evaluation value for the detected object k (Yes), the object processing unit 23 executes step S12. On the other hand, as a result of the determination, if the first evaluation value for the detected object k is not higher than the first evaluation value for the second exclusion candidate (No), the object processing unit 23 executes step S11. That is, in step S10, since extraction of the first exclusion candidate is invalid and extraction of the second exclusion candidate is not invalid, the determination is performed in accordance with ""approach" first evaluation value |na≤na0">""other" first evaluation value">""front" first evaluation value |nb>nb0" in Inequality 1. Thus, a case where the first evaluation value for the detected object k is "approach" or "other" is determined to be a case of "Yes", to execute step S12, and a case where the first evaluation value for the detected object k is "front" is determined to be a case of "No", to execute step S11.

In step S11, since determination has not been successfully made by comparison of the first evaluation values based on the first criterion, comparison of the second evaluation values based on the second criterion is to be performed, so that the object processing unit 23 determines whether or not the second evaluation value for the detected object k is higher than the second evaluation value for the second exclusion candidate. Step S11 is executed in a case where the first evaluation value is "front". Therefore, the distance which is the second B criterion is used as the second criterion, and the value of the distance which is the second B evaluation value is used as the second evaluation value. As a result of the determination, if the second B evaluation value for the detected object k is higher than the second B evaluation value for the second exclusion candidate, i.e., if the distance to the detected object k is shorter than the distance to the second exclusion candidate and therefore the second B evaluation value for the second exclusion candidate is lower than the second B evaluation value for the detected object k (Yes), the object processing unit 23 executes step S12 and then ends the selection storage processing on the object for the identification number k. On the other hand, as a result of the determination, if the second B evaluation value for the detected object k is not higher than the second B evaluation value for the second exclusion candidate (No), the object processing unit 23 ends the selection storage processing on the object for the identification number k.

In step S12, the object processing unit 23 stores, as the processing target object, the object for the identification number k (detected object k) newly detected by the detection processing unit 22, in place of the object that is the second exclusion candidate, in the processing target object storage unit 31.

In step S13, the object processing unit 23 determines whether or not "invalidation of extraction" is set for the third exclusion candidate. As a result of the determination, if "invalidation of extraction" is set for the third exclusion candidate (Yes), the object processing unit 23 ends the selection storage processing on the object for the identification number k (therefore, each processing in steps S14 to S16 is not executed). On the other hand, as a result of the determination, if "invalidation of extraction" is not set for the third exclusion candidate (No), the object processing unit 23 executes step S14.

In step S14, the object processing unit 23 determines whether or not the first evaluation value for the object for the identification number k (detected object k) newly detected by the detection processing unit 22 is higher than the first evaluation value for the third exclusion candidate. Determination for the first evaluation values is performed on the basis of the above Inequality 1. As a result of the determination, if the first evaluation value for the detected object k is higher than the first evaluation value for the third exclusion candidate, i.e., if the first evaluation value for the third exclusion candidate is lower than the first evaluation value for the detected object k (Yes), the object processing unit 23 executes step S16. On the other hand, as a result of the determination, if the first evaluation value for the detected object k is not higher than the first evaluation value for the third exclusion candidate (No), the object processing unit 23 executes step S15. That is, in step S14, since extraction of the first and second exclusion candidates is invalid, the determination is performed in accordance with ""approach" first evaluation value|na≤na0">""front" first evaluation value|nb≤nb0">""other" first evaluation value" in Inequality 1. Thus, a case where the first evaluation value for the detected object k is "approach" or "front" is determined to be a case of "Yes", to execute step S16, and a case where the first evaluation value for the detected object k is "other" is determined to be a case of "No", to execute step S15.

In step S15, since determination has not been successfully made by comparison of the first evaluation values based on the first criterion, comparison of the second evaluation values based on the second criterion is to be performed, so that the object processing unit 23 determines whether or not the second evaluation value for the detected object k is higher than the second evaluation value for the third exclusion candidate. Step S15 is executed in a case where the first evaluation value is "other". Therefore, the distance which is the second B criterion is used as the second criterion, and the value of the distance which is the second B evaluation value is used as the second evaluation value. As a result of the determination, if the second B evaluation value for the detected object k is higher than the second B evaluation value for the third exclusion candidate, i.e., if the distance to the detected object k is shorter than the distance to the third exclusion candidate and therefore the second B evaluation value for the third exclusion candidate is lower than the second B evaluation value for the detected object k (Yes), the object processing unit 23 executes step S16 and then ends the selection storage processing on the object for the identification number k. On the other hand, as a result of the determination, if the second B evaluation value for the detected object k is not higher than the second B evaluation value for the third exclusion candidate (No), the object processing unit 23 ends the selection storage processing on the object for the identification number k.

In step S16, the object processing unit 23 stores, as the processing target object, the object for the identification number k (detected object k) newly detected by the detection processing unit 22, in place of the object that is the third exclusion candidate, in the processing target object storage unit 31.

As described above, the processing in steps S2 to S16 is performed as the selection storage processing.

Then, the driving assistance unit 4 assists driving on the basis of the processing target objects stored in the processing target object storage unit 31. For example, the collision mitigation braking, the following-traveling assistance, the rearward-thing-presence warning assistance, or the like is performed.

As described above, in the object recognition device S and the object recognition method implemented therein according to the embodiment, the processing target object associated with the lowest evaluation value is selected from the processing target objects stored in the processing target object storage unit 31. Therefore, the processing target objects stored in the processing target object storage unit 31 need not be sorted (rearranged) in priority order. In the object recognition device S and the object recognition method described above, determination of an object to be stored in the processing target object storage unit 31 can be performed by comparing the evaluation value for the selected processing target object and the evaluation value for an object newly detected by the object detection unit OD. Thus, the object recognition device S and the object recognition method described above can select recognition objects through simpler information processing.

Figure 6A:
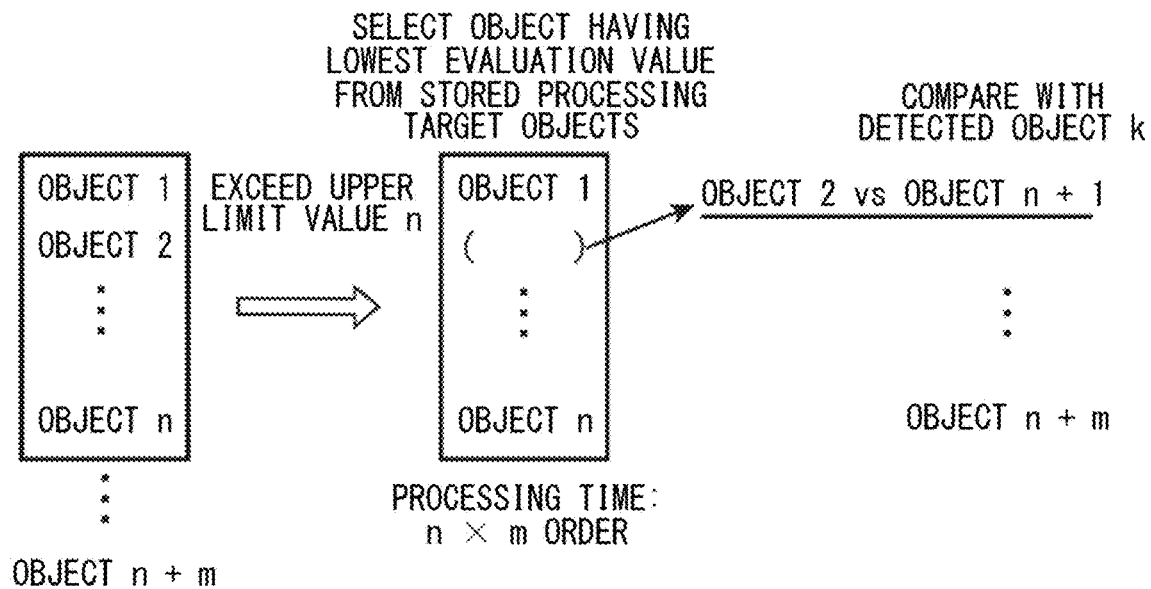
FIG. 6A and FIG. 6B illustrates effects of the object recognition device.
Figure 6B:
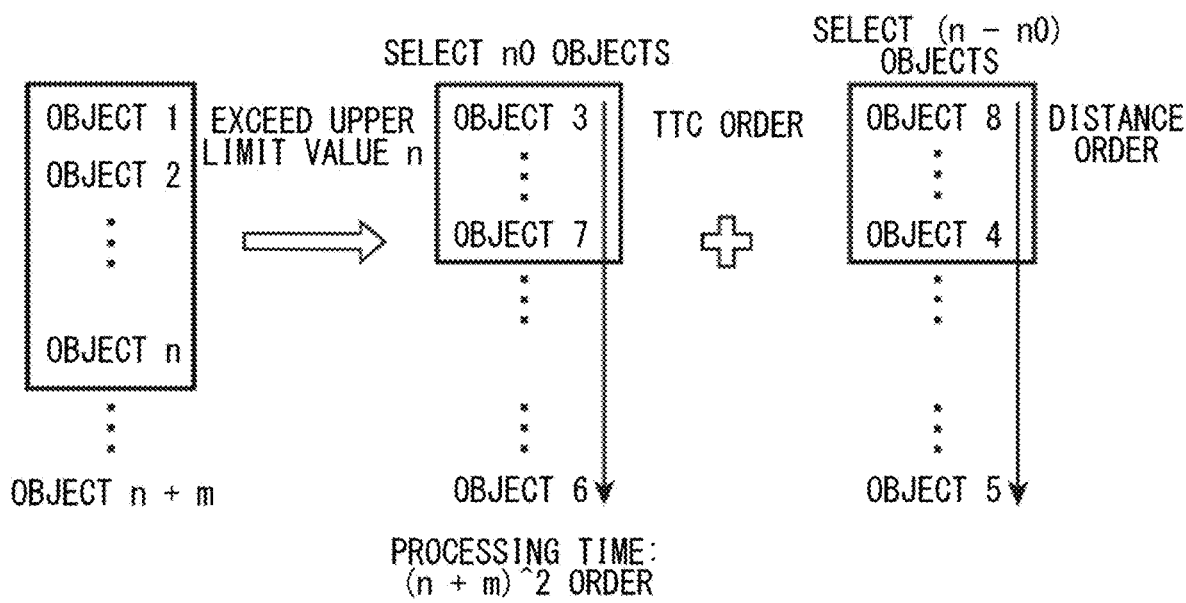

FIG. 6A and FIG. 6B illustrates effects of the object recognition device. FIG. 6A conceptually illustrates a case of the present embodiment, and FIG. 6B conceptually illustrates a case of Patent Document 1.

More specifically, in the vehicle surrounding monitoring device disclosed in Patent Document 1, as shown in FIG. 6B, (n+m) objects composed of n existing objects and m new objects are sorted in a time-to-collision order, and then a top first set number of objects are selected therefrom. Further, the remaining objects are sorted in a relative distance order, and then a top second set number of objects are selected therefrom. Thus, the processing time therefor is roughly on the order of (n+m)2. On the other hand, in the present embodiment, as shown in FIG. 6A, among (n+m) objects, an object having the lowest evaluation value is selected from n objects, and m objects are each compared with the object having the lowest evaluation value, so that the processing time therefor is roughly on the order of (n×m). Thus, the object recognition device S and the object recognition method can select recognition objects through simpler information processing.

In the object recognition device S and the object recognition method described above, the selection storage processing is performed for a plurality of objects one by one sequentially. Therefore, for example, in a case where one (e.g., detected object k) of the plurality of objects is stored as a processing target object in the processing target object storage unit 31 through the selection storage processing, when the selection storage processing is performed on an object (e.g., detected object k+1) other than the one object, the one object and the other object can be compared with each other by their evaluation values. Thus, even in a case where a plurality of objects are newly detected by the object detection unit, an object having a truly high evaluation value can be stored as the processing target object in the processing target object storage unit 31.

In the object recognition device S and the object recognition method described above, a plurality of evaluation values based on a plurality of criteria that are different kinds are provided as evaluation values to be associated with the objects. Thus, objects to be stored in the processing target object storage unit 31 can be determined from various perspectives by the plurality of criteria (indices, references) that are different kinds.

In the object recognition device S and the object recognition method described above, extraction is performed for each of groups into which objects are divided by respective first evaluation values. Thus, a processing target object as a candidate for the selection can be extracted using various sides (levels) of the first criterion.

In the object recognition device S and the object recognition method described above, in a case where, in the group imparted with the minimum keeping value, the number of processing target objects stored in the processing target object storage unit 31 is the minimum keeping value or smaller, the extraction is invalidated. Thus, it is at least ensured that the processing target objects in the group imparted with the minimum keeping value are stored.

In the object recognition device S and the object recognition method described above, an object to be stored in the processing target object storage unit 31 can be determined from the perspective of the first criterion having the first evaluation value determined on the basis of the direction and the traveling state of each object relative to the sensor platform (vehicle VC). In the object recognition device S and the object recognition method described above, an object to be stored in the processing target object storage unit 31 can be determined from the perspective of the second criterion having the second evaluation value determined on the basis of the traveling state of the object relative to the sensor platform (vehicle VC) or the direction of the object relative to the sensor platform.

In the object recognition device S and the object recognition method described above, firstly, the one object is determined by the first evaluation value based on the first criterion. Thus, an object to be stored in the processing target object storage unit 31 can be determined from the perspective of the first criterion. Secondly, in a case where the one object is not successfully determined by the first evaluation value based on the first criterion, the one object is determined by the second evaluation value based on the second criterion. Thus, even in a case where an object to be stored in the processing target object storage unit 31 cannot be determined from the perspective of the first criterion, an object to be stored in the processing target object storage unit 31 can be determined from the perspective of the second criterion. In the above example, in the object recognition device S and the object recognition method described above, an object to be stored in the processing target object storage unit 31 can be determined, firstly, from the perspective of the first criterion having the first evaluation value determined on the basis of the direction and the traveling state of the object relative to the sensor platform, and secondly, from the perspective of the second A criterion having the second A evaluation value determined by the value of the time to collision or the perspective of the second B criterion having the second B evaluation value determined by the value of the distance.

In the above embodiment, the object processing unit 23 may determine whether or not to invalidate the extraction, only in a case where the traveling state of the sensor platform satisfies a predetermined condition. Thus, since whether or not to invalidate the extraction is determined only in a case where the traveling state of the sensor platform (vehicle VC) satisfies the predetermined condition, it is possible to determine whether or not to invalidate the extraction in consideration of the traveling state of the sensor platform (vehicle VC). For example, in a case of applying driving assistance (e.g., the following-traveling assistance) for the driving assistance unit 4 using an object recognition result, if a condition (application condition) is set for the application (e.g., if there is an application condition for the following-traveling assistance that following-traveling can be assisted only when the vehicle velocity is a predetermined threshold or greater), the predetermined condition may be set as the application condition. Thus, when the predetermined condition is satisfied, the application condition is satisfied and whether or not to invalidate the extraction is determined.

For example, the traveling state of the sensor platform (vehicle VC) may be a velocity (vehicle velocity), and the predetermined condition may be that the velocity of the sensor platform (vehicle VC) is a predetermined velocity (velocity threshold) or greater. In this case, only when the velocity of the sensor platform (vehicle VC) is the velocity threshold or greater, the object processing unit 23 determines whether or not to invalidate the extraction. More specifically, in step S48 in FIG. 5, as shown by description in parentheses, step S48 is executed only when the vehicle velocity of the sensor platform (vehicle VC) is a velocity threshold ve or greater. If the velocity of the sensor platform (vehicle VC) is not the velocity threshold ve or greater, step S48 is skipped and the extraction is not invalidated.

While the present invention has been appropriately and sufficiently described above through the embodiment with reference to the drawings in order to express the present invention, it should be understood that the skilled person could easily vary and/or modify the above embodiment. Therefore, such a variation or a modification made by the skilled person is considered to be incorporated in the scope of the claims unless the variation or the modification is at such a level as to deviate from the scope of the claims.

DESCRIPTION OF THE REFERENCE CHARACTERS

S object recognition device
OD object detection unit
1-1 first detection unit
1-2 second detection unit
1-3 third detection unit
1-4 fourth detection unit
1-5 fifth detection unit
2 control processing unit
3 storage unit
4 driving assistance unit
21 control unit
22 detection processing unit
23 object processing unit
31 processing target object storage unit

The invention claimed is:

1. An object recognition device provided to a sensor platform which is a mobile object or a roadside unit, the object recognition device comprising:
an object detector which detects, as an object, a thing present around the sensor platform;
a processing target object storage which stores the object as a processing target object, with a number thereof being a predetermined upper limit value or smaller, such that the processing target object is associated with an evaluation value for storing and keeping the processing target object, the evaluation value being determined in accordance with a situation of the object relative to the sensor platform; and
an object processing circuitry which, in a case where the processing target objects whose number is the upper limit value are stored in the processing target object storage, performs selection storage processing of selecting a processing target object associated with a lowest evaluation value among the processing target objects whose number is the upper limit value and which are stored in the processing target object storage, determining one object of the selected processing target object and an object newly detected by the object detector on the basis of the evaluation value for the selected processing target object and the evaluation value for the object newly detected by the object detector, and storing the determined object as the processing target object in the processing target object storage, wherein
the evaluation value to be associated with each object includes a plurality of evaluation values based on a plurality of criteria that are different kinds, and
in the selection of the processing target object associated with the lowest evaluation value, the object processing circuitry extracts processing target objects as candidates for the selection by the first evaluation value based on a first criterion among the plurality of criteria, from the processing target objects whose number is the upper limit value and which are stored in the processing target object storage, and selects the processing target object associated with the lowest evaluation value, from the processing target objects extracted as the candidates for the selection, on the basis of a second evaluation value based on a second criterion different from the first criterion among the plurality of criteria.

2. The object recognition device according to claim 1, wherein
in a case where a plurality of objects are newly detected by the object detector, the object processing circuitry performs the selection storage processing for the plurality of objects one by one sequentially.

3. The object recognition device according to claim 1, wherein
in the extraction of the processing target objects as the candidates for the selection, the object processing circuitry divides the processing target objects stored in the processing target object storage and the object newly detected by the object detector into a plurality of groups for respective first evaluation values based on the first criterion, and performs the extraction for each group.

4. The object recognition device according to claim 3, wherein
a minimum keeping value which is a minimum number of the processing target objects that should be stored and kept in the processing target object storage is imparted correspondingly to the group, and
in the extraction for each group, in a case where the group is imparted with the minimum keeping value, the object processing circuitry compares the number of the processing target objects stored in the processing target object storage with the minimum keeping value, and as a result of the comparison, if the number of the processing target objects stored in the processing target object storage is the minimum keeping value or smaller, the object processing circuitry invalidates the extraction.

5. The object recognition device according to claim 4, wherein the object processing circuitry determines whether or not to invalidate the extraction, only in a case where the sensor platform is a mobile object and a traveling state of the mobile object satisfies a predetermined condition.

6. The object recognition device according to claim 1, wherein in the determination of one object of the selected processing target object and the object newly detected by the object detector, firstly, the object processing circuitry determines the one object by the first evaluation value based on the first criterion, and secondly, in a case where the one object is not successfully determined by the first evaluation value based on the first criterion, the object processing circuitry determines the one object by the second evaluation value based on the second criterion.

7. The object recognition device according to claim 6, wherein the first evaluation values based on the first criterion include "approach" which indicates that the object is approaching the sensor platform, "front" which indicates that the object is located in front of the sensor platform, and "other" which indicates that the object corresponds to neither the "approach" nor the "front" relative to the sensor platform.

8. The object recognition device according to claim 6, wherein the second evaluation values based on the second criterion include a value of a time to collision of the object with the sensor platform and a value of a distance of the object from the sensor platform.

9. An object recognition method to be executed in a sensor platform which is a mobile object or a roadside unit, the object recognition method comprising:

detecting, as an object, a thing present around the sensor platform; and storing, in a processing target object storage, the object as a processing target object, with a number thereof being a predetermined upper limit value or smaller, such that the processing target object is associated with an evaluation value for storing and keeping the processing target object, the evaluation value being determined in accordance with a situation of the object relative to the sensor platform; and in a case where the processing target objects whose number is the upper limit value are stored in the processing target object storage, selecting a processing target object associated with a lowest evaluation value among the processing target objects whose number is the upper limit value and which are stored in the processing target object storage, determining one object of the selected processing target object and an object newly detected by the object detector on the basis of the evaluation value for the selected processing target object and the evaluation value for the object newly detected by the object detector, and storing the determined object as the processing target object in the processing target object storage, wherein the evaluation value to be associated with each object includes a plurality of evaluation values based on a plurality of criteria that are different kinds, and in the object processing, in the selection of the processing target object associated with the lowest evaluation value, processing target objects are extracted as candidates for the selection by the first evaluation value based on a first criterion among the plurality of criteria, from the processing target objects whose number is the upper limit value and which are stored in the processing target object storage, and the processing target object associated with the lowest evaluation value is selected from the processing target objects extracted as the candidates for the selection, on the basis of a second evaluation value based on a second criterion different from the first criterion among the plurality of criteria.

* * * * *